G. BORSTAD.
HARROW WITH CLEANING ATTACHMENT.
APPLICATION FILED MAY 8, 1920.

1,373,946.

Patented Apr. 5, 1921.
2 SHEETS—SHEET 1.

INVENTOR:
Gilbert Borstad.
BY his ATTORNEY:
A. M. Carlsen.

G. BORSTAD.
HARROW WITH CLEANING ATTACHMENT.
APPLICATION FILED MAY 8, 1920.
1,373,946.
Patented Apr. 5, 1921.
2 SHEETS—SHEET 2.
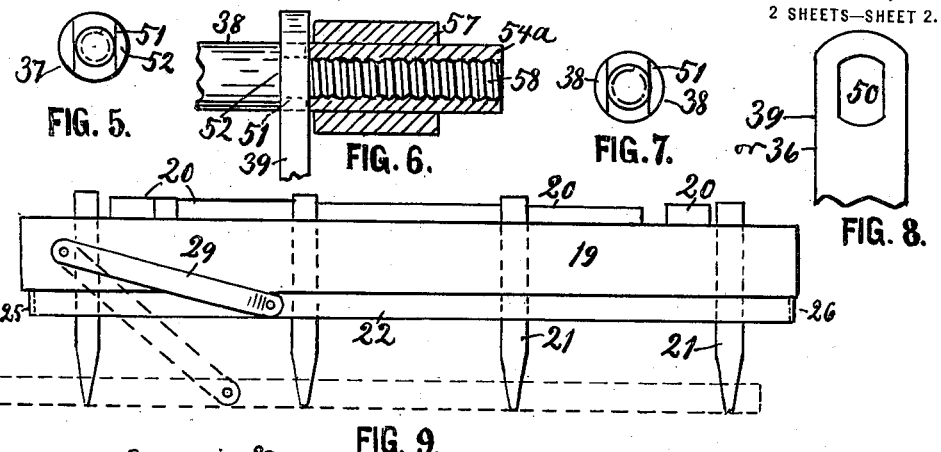
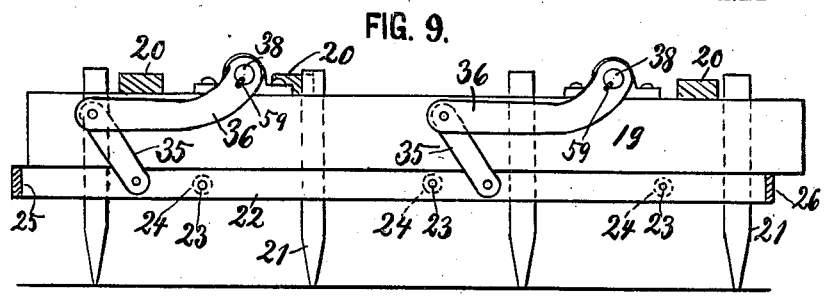
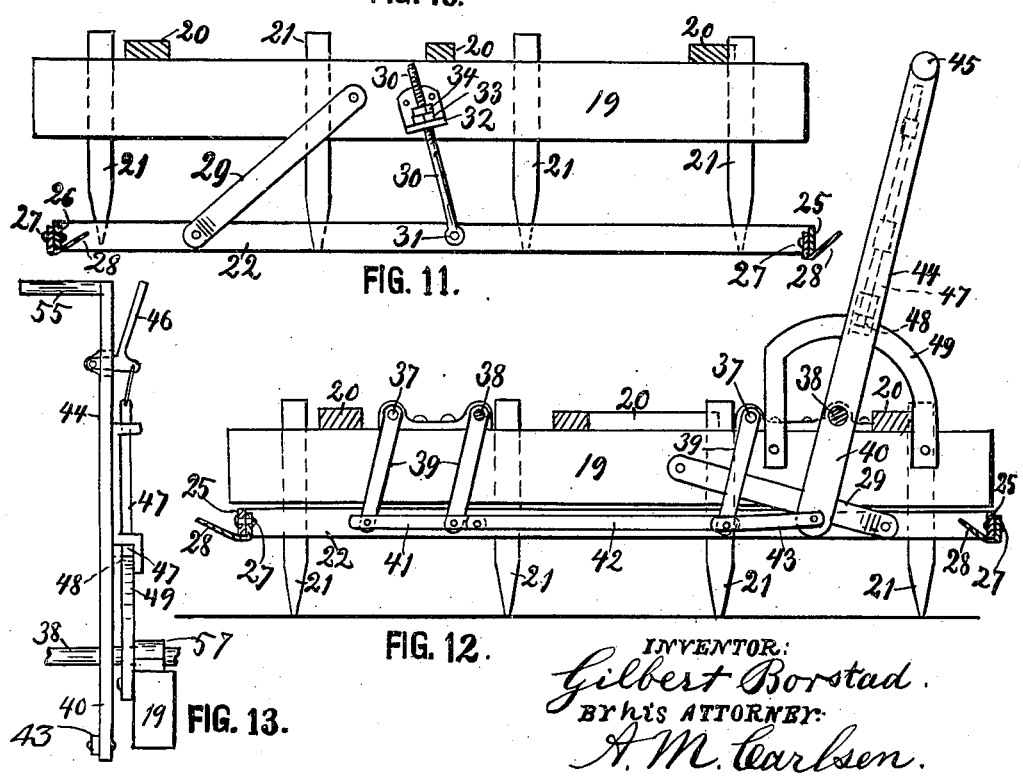
INVENTOR:
Gilbert Borstad.
BY HIS ATTORNEY:
A. M. Carlsen.

UNITED STATES PATENT OFFICE.

GILBERT BORSTAD, OF STARBUCK, MINNESOTA.

HARROW WITH CLEANING ATTACHMENT.

1,373,946.  Specification of Letters Patent.  Patented Apr. 5, 1921.

Application filed May 8, 1920. Serial No. 379,820.

*To all whom it may concern:*

Be it known that I, GILBERT BORSTAD, a citizen of the United States, residing at Starbuck, in the county of Pope and State of Minnesota, have invented a new and useful Harrow with Cleaning Attachment, of which the following is a specification.

My invention relates to harrows or drags having means by which to readily clean their teeth of weeds and roots while the harrow is in motion or use. The implement may be used as a pulverizer of the soil and at the same time as a drag for cleaning the soil of quack-grass and other weeds and rubbish, or for either of said purposes.

Figure 1:
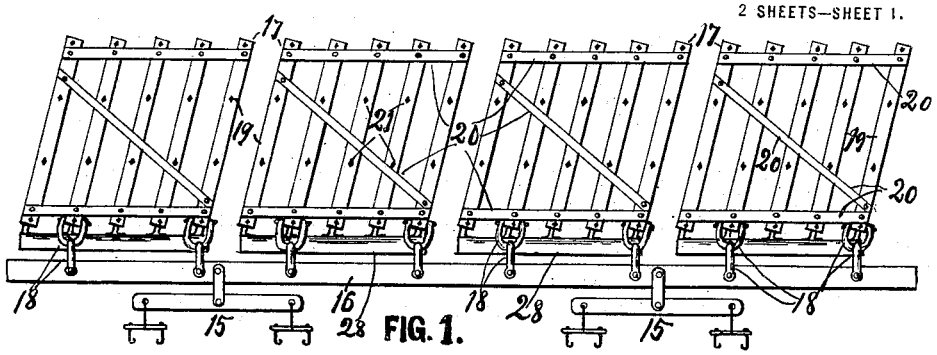
Figure 2:
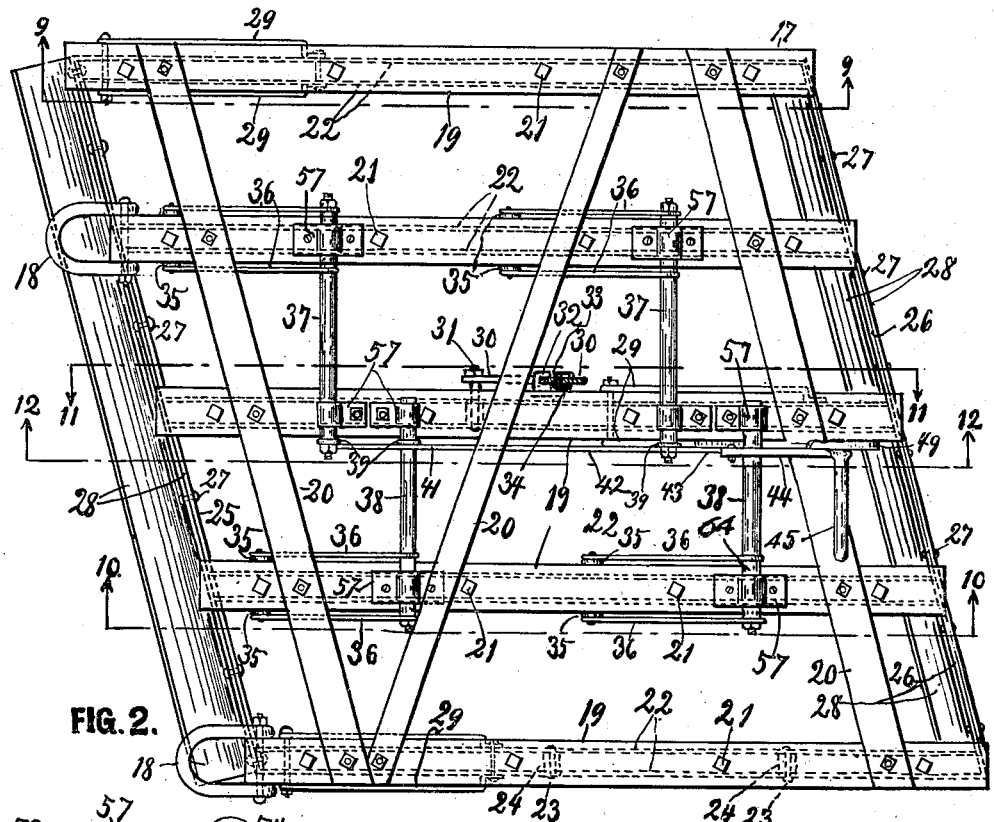
Figures 3, 4:
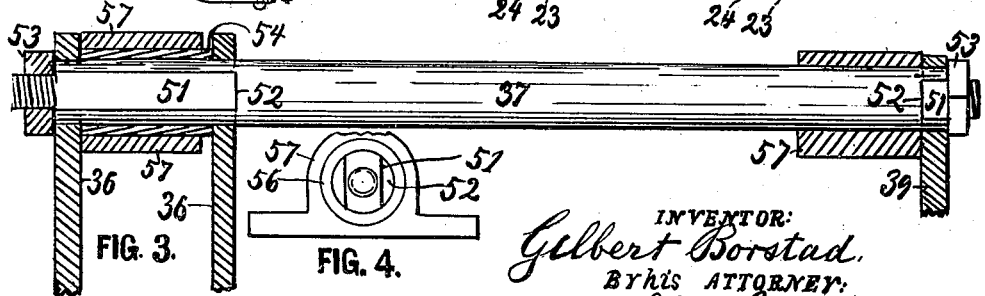

In the accompanying drawing:

Figure 1 is a plan view of the improved implement, showing how it may preferably be made in four sections drawn by a single evener bar having draft appliances for several horses. Fig. 2 is a plan view of one of the sections on an enlarged scale. Fig. 3 is a partly sectional detail view of one of the rock shafts 37 in Fig. 2. Fig. 4 is a left hand end view of the shaft in Fig. 3 with the nut 53 and outer arm 36 removed. Fig. 5 is a right hand end view of the shaft in Fig. 3 with nut, lever and bearing omitted. Fig. 6 is a partly sectional detail view of the inward end of either one of the two rock shafts 38, in Fig. 2. Fig. 7 is a right hand end view of the shaft in Fig. 6. Fig. 8 is a detail view of a part of one of several rocker arms fixed on rock shaft. Fig. 9 is an elevation of the lower edge of Fig. 2, but represents also a section on line 9—9 in Fig. 2. Figs. 10, 11, and 12 are sections respectively on the lines 10, 11 and 12 in Fig. 2. Fig. 13 is an elevation of the operating lever and some adjacent parts looking as from right to left in Fig. 12.

Referring to the drawings by reference numerals, 15 in Fig. 1 designates draft appliances attached to an evener bar 16, to which several harrow sections 17 may be attached by clevises 18, as shown in Fig. 1; but as the scale in said view is too small for showing the invention clearly, one of the harrow sections is enlarged in Fig. 2 and other views, where it will be seen that each section is in a way an independent harrow and is composed of a series of parallel frame bars 19 and bracing bars 20. Secured in the bars 19 are regular harrow teeth 21, preferably of rectangular cross section and arranged to be drawn with one corner forward. The teeth are also arranged in such alternate positions that when the section is drawn in a direction at right angles to its front edge the teeth will move in parallel lines only a few inches apart.

Arranged to be moved in vertical directions about the teeth so as to clean them, is a skeleton frame composed of several longitudinal metal bars 22, which are secured together in pairs with rivets 23 and spacing tubes 24 (see Fig. 10 and lower bar of Fig. 2) so as to retain one bar of each pair near each side of a row of the harrow teeth. Said pairs of bars have their ends secured together by a front cross bar 25 and a rear cross bar 26. To each of said cross bars is secured at 27 a grooved or channeled plate forming a kind of runner or guide 28, which enables the skeleton frame to glide over slight obstructions, especially over the weeds accumulated by the harrow teeth, when the teeth are to pass over the same.

The skeleton frame or cleaning attachment thus formed is connected to the harrow frame by inclined links 29 which prevent too much rearward displacement of the attachment when it is in contact with the ground. The downward displacement is limited by an almost vertical rod 30 (see Figs. 2 and 11) having its lower end pivoted at 31 to the attachment and is extended loosely upward through a bracket 32 fixed on the frame 19, and threaded and provided with a nut 33 and a jam nut 34 above the bracket, said nuts serving to regulate and stop the downward movement of the rod and the attachment.

The cleaning attachment is raised and lowered by links 35, from rocker arms 36 fixed on rocker-shafts 37 and 38. Said shafts are rocked by rocking arms 39, which are connected by links 41, 42, 43; and the arm 40 is a part of a hand lever 44, having a handle 45 with a finger lever 46 operating a dog 47, which is arranged to engage in a notch 48 of a segmental bracket 49 fixed on the main frame.

In the operation of the harrow, when the dog is in said notch the attachment 22 is held close up under the harrow frame and when the dog is disengaged and the lever 44 swung forwardly the attachment will move downward as in Fig. 11 and thereby raise the frame and cause the accumulated weeds and roots to escape downwardly below the teeth; and when the teeth have passed over the same the lever 44 is swung rearwardly again and the dog engaged in the notch, thus allowing the harrow to sink its teeth into the ground as soon as it has passed over the place where it was lifted out of the ground and the gathered weeds.

The rocker arms and shafts are very cheaply but strongly made and put together, preferably in the following manner. Each arm is cheaply made from flat bar iron and has punched in it an oblong hole 50 (see Fig. 8) adapted to fit a flattened portion 51 of the shaft and be held tightly against shoulders 52 either directly by a screw nut 53, as at the rocking arm 39 to the right in Fig. 3, or indirectly by the nut and by a bushing 54 filling between two rocked arms 36, as to the left in Fig. 3. In the latter instance the bushing is firmly held by the arms and is placed in the bearing 57 of the shaft, thus enabling the one nut 53 to hold the two arms 36 spaced apart one at each side of the bearing.

In Fig. 6, where only one arm, 39, is to be secured on the shaft, and that near the inner end of the bearing 57, the bushing 54ᵃ is threaded upon a reduced portion 58 of the shaft and screwed against the arm 39, which is thereby firmly held upon the flat portion 51 and against the shoulder 52 of the shaft. This method enables the bearing to be slipped off from the shaft whenever so required without disturbing the fixed condition of the arm on the shaft. In Fig. 10, keys 59 indicate that the arms may be secured by any suitable means.

From the description thus given it will be seen that the implement will in one operation harrow and pulverize the soil and also clean the weeds, roots and other undesirable stuff out of the soil, and leave them in certain places on the field so they can be further removed by any suitable means.

What I claim is,

1. In a harrow, a series of teeth and a tooth cleaning attachment movable up and down on the teeth, means for moving the attachment, and means for regulating and limiting the downward movement of the attachment.

2. In a harrow cleaning attachment, a rock shaft having an end portion flattened at two sides, producing two shoulders, a rocker arm with an oblong hole fitting the flattened end and a nut threaded upon the end of the shaft and holding the rocker arm against said shoulders.

3. In a harrow cleaning attachment a rock shaft having one end flattened at two opposite sides with a shoulder at the end of each flat side, a nut threaded upon the end of the shaft, two rocker arms having oblong holes fitting the flat portion of the shaft, a bushing interposed between the rocker arms to space them apart and one of them against the shoulders when the nut is drawn tight against the other one.

4. The structure specified in claim 3, and a journal bearing embracing the bushing to support the shaft.

In testimony whereof I affix my signature.

GILBERT BORSTAD.